June 11, 1946. P. LIDDICOAT 2,401,834
PROCESS AND APPARATUS FOR MAKING DETACHABLE DRILL BITS
Filed Nov. 16, 1942 3 Sheets-Sheet 1
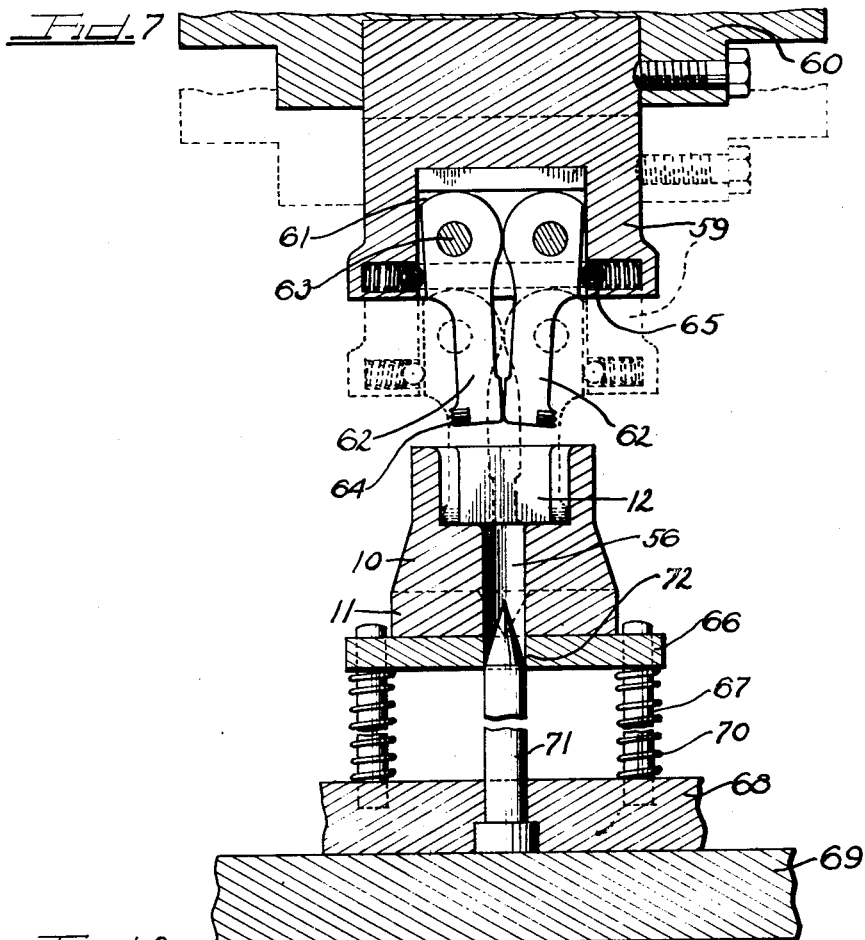
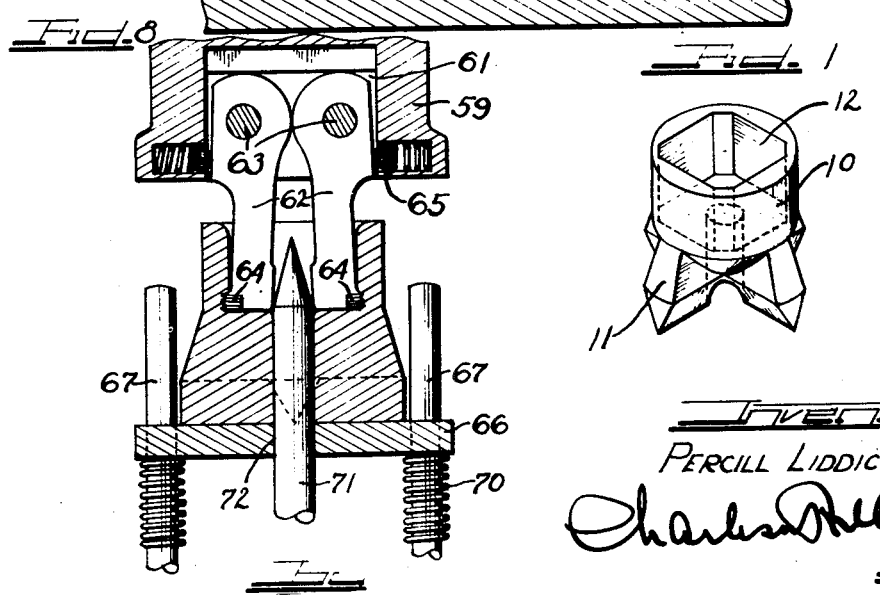
Inventor
PERCILL LIDDICOAT

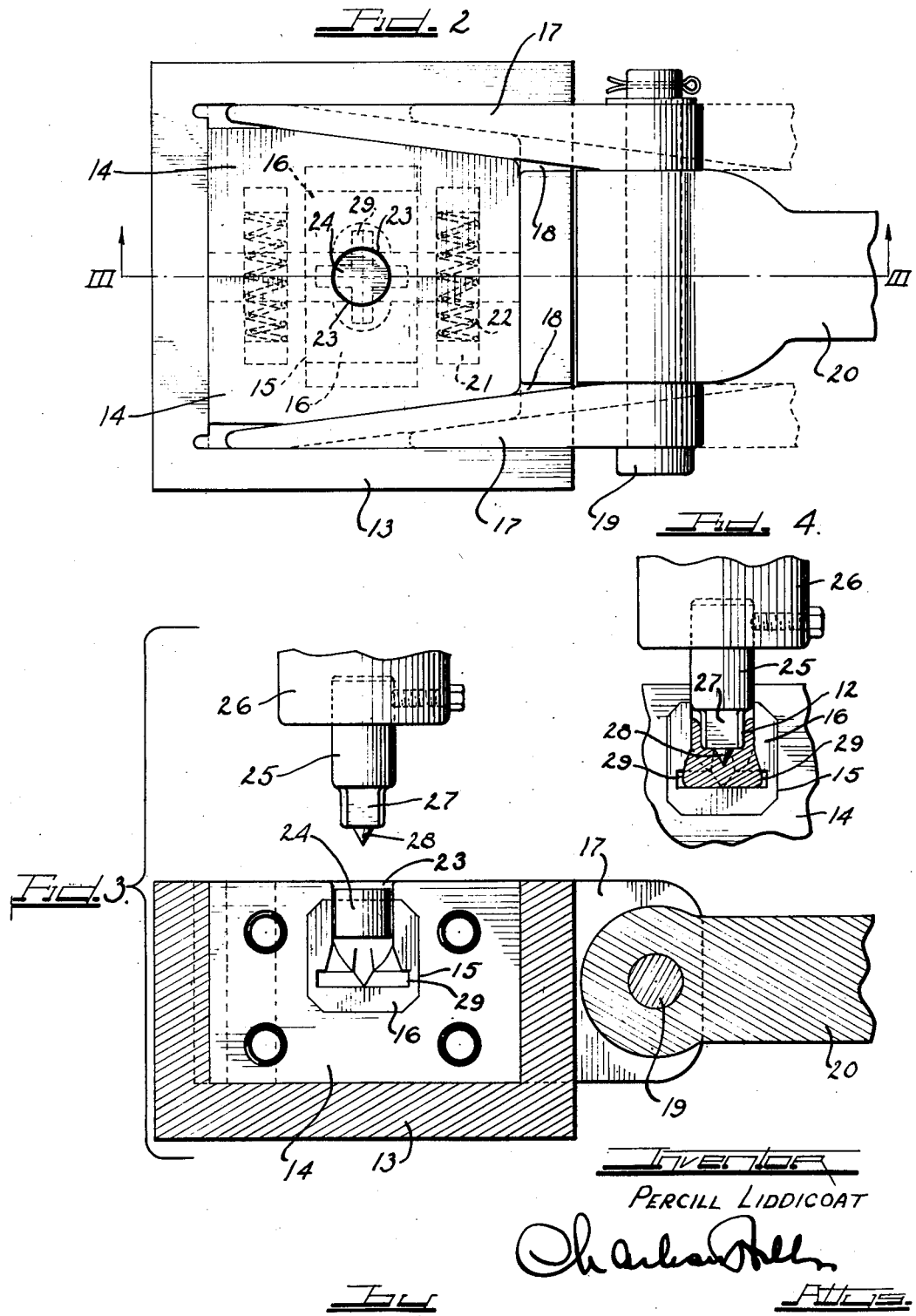

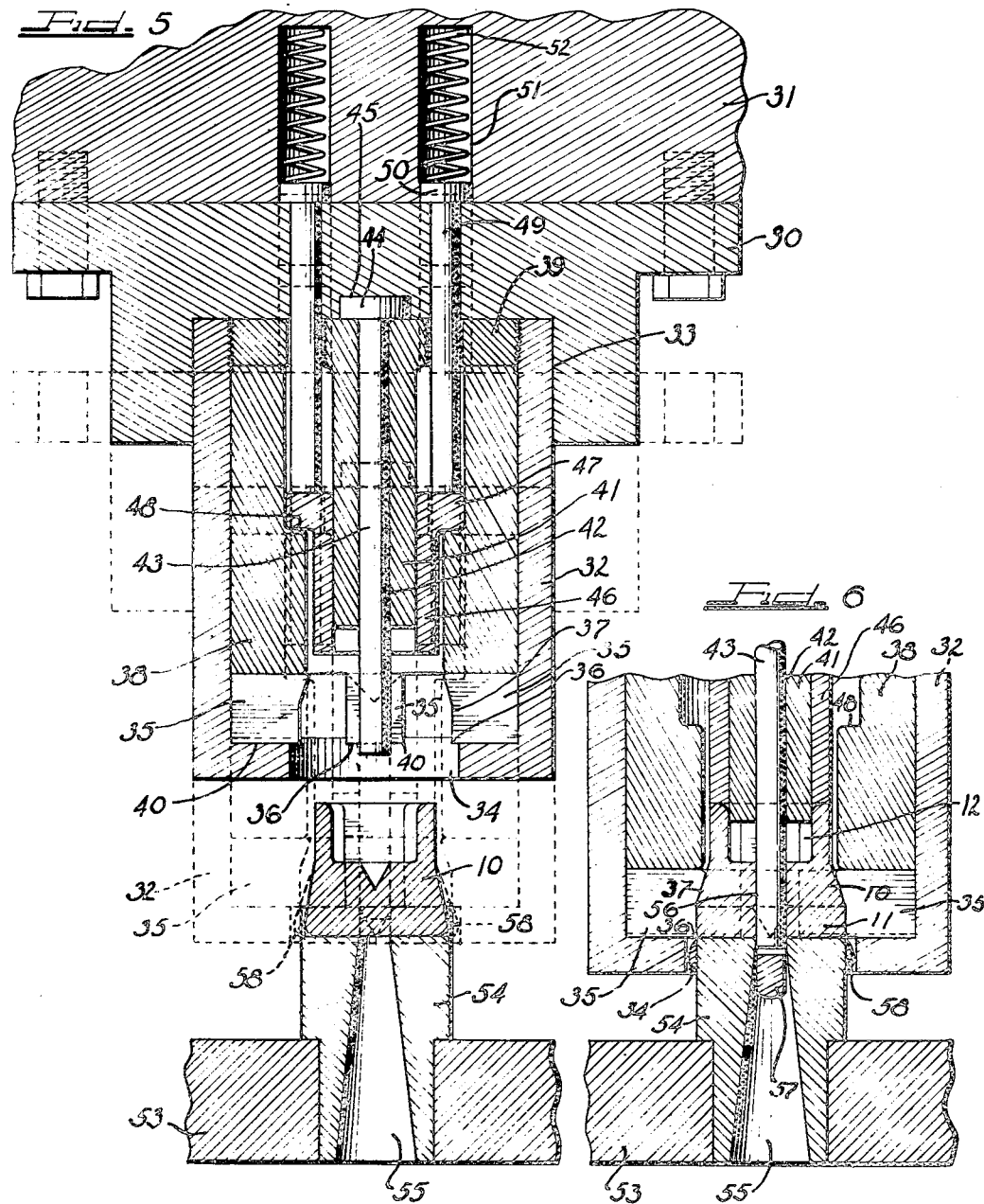

Patented June 11, 1946

2,401,834

UNITED STATES PATENT OFFICE 2,401,834

PROCESS AND APPARATUS FOR MAKING DETACHABLE DRILL BITS

Percill Liddicoat, Niagara-on-the-Lake, Ontario, Canada

Application November 16, 1942, Serial 465,808

6 Claims. (Cl. 76—5)

My invention relates to a process and apparatus for making detachable drill bits. The invention is particularly useful and adaptable in the manufacture of rock drill bits which have a drill rod receiving shank for securing the bit to a drill rod and which have a hole therethrough for the flow of water from the drill rod onto the face of the rock being cut.

Heretofore in the manufacture of the type of bit referred to, the finishing of the socket and the forming of the water hole required the use of expensive machine drilling and finishing with low output per man hour and weakening of the finished bit because of cutting by machine tools across the grain of the metal.

According to this invention the socket can be finished and the water hole can be formed after the initial forging process without reheating the bit. The initially forged socket has the water hole formed therein by punching out a slug of metal and, at the time of this punching operation, the outside of the bit can be die shaped to its final form. The punched out slug can be of smaller diameter than the hole since, in the die shaping of the bit, the metal defining the hole can be expanded. This conserves metal.

A feature of the invention resides in imprinting indentations in the inner walls of a bit socket or similar article.

An important object of my invention is to provide a process for making stronger and more efficient bits of the type referred to, with greater output per man hour and by the use of comparatively simple inexpensive forging, punching, dieing, and trimming apparatus.

Another important object of the invention is to provide a process and means whereby an initially forged drill bit may be punched, trimmed and shaped without reheating, so that one heating of the slug of metal from which the bit is made will be sufficient for the entire process.

Another important object is to provide a single apparatus which in one stroke will punch a forged bit to form the water hole, and will trim and die the bit to its final form.

The above enumerated and other objects and features of my invention will become apparent from the description of the drawings which show efficient apparatus for carrying out these various features.

On the drawings:

Figure 1 is a perspective view of a finished drill bit made by punching, trimming and die shaping steps of this invention.

Figure 2 is a plan view of a die and holder assembly for supporting a slug of metal to be initially forged into drill bit shape.

Figure 3 is a section on plane III—III of Figure 2 showing the punch about to engage with the slug in the die holder;

Figure 4 shows the punch forging the slug into rough drill bit shape;

Figure 5 is a longitudinal sectional view of a composite punching, trimming and dieing assembly for finally shaping the initially forged bit.

Figure 6 is a view similar to Figure 5, but showing the punching, trimming and forming position of the parts;

Figure 7 is a vertical section of an assembly for providing indentations or other formations in the inner side of the socket wall of the bit; and, Figure 8 is a view similar to Figure 7 showing the assembly in operation.

As shown on the drawings:

Figure 1 shows a type of drill bit that can be made from an initially forged metal slug in accordance with this invention. The bit comprises a cylindrical body 10 having teeth 11 extending from its base and in its upper portion having the socket 12 which may be polygonal as shown, or of any other desired cross section.

Figures 2, 3 and 4 show a form of die holder in which the bit may be efficiently held during initial forging thereof. The die holder shown comprises a rectangular housing or box 13 for a set of die holders 14 which have opposed recesses 15 in which the die halves 16 of the forging die assembly are received and supported. Wedge plates 17 extend through openings 18 in a side wall of the housing 13 with their inclined faces against the outer inclined sides of the holders 14 so that upon inward shift of the wedge plates these holders will be forced together to securely hold the die members 16 together to form the die space into which metal is to be forced and forged to form the bit. The wedge plates 17 are shown as movable horizontally and extend from a pin 19 in the inner end of an arm 20. The housing 13 is securely fastened to the bed of a press and the arm 20 is actuated by cams, toggles, or other suitable mechanism (not shown) for shifting the wedge plates 17 into and out of the housing 13. The die holders 14 have opposed pockets 21 for receiving springs 22 which serve to spread the holders 14 apart for removal of a forged bit after the wedge plates 17 have been withdrawn.

The die holders 14 have opposed recesses 23 which, when the die holders are wedged together, form a passageway into the forging space of the die for a metal slug 24 which is first heated to the desired temperature. The slug passageway shown is cylindrical, but it may be of any other shape. This slug passageway also receives the forging punch 25 secured in the lower end of a ram 26 operable on the press above the press bed on which the die housing 13 is secured. As shown, the body of the punch is cylindrical to fit through the passageway to which the slug has been inserted, and the lower end 27 of the punch is of reduced cross section of a shape to define the shape of the socket 12 of the bit. Figures 2 and 3 show a slug 24 inserted into the dies ready for the forging operation. As the punch 25 is brought down by the ram against the top of the slug, it meets little resistance as the metal of the heated slug is more or less plastic, and the slug is pressed down toward the bottom of the forging impression or space in the dies. As the punch continues the slug metal is forced downwardly by the punch pressure to fill out the bottom of the die recess. Where the bit to be forged requires flow of metal laterally into depression corners or spaces at the bottom of the die, a conical extension 28 may be provided on the end of the punch. With such arrangement, as the resistance of the metal increases because of difficulty of flowing into impressions at the bottom of the die, the conical point or extension tends to partly pierce the slug, as shown on Figure 4, thus causing displacement of metal ahead of the punch end 27 in a direction to cause the metal to substantially fill the impression spaces at the bottom of the die such as the spaces 29, the metal being forced into these spaces forming part of the teeth 11. As the hot metal is being finally forced down into the bottom of the die cavity by the end 27 of the punch and its point 28, the cylindrical body 25 of the punch enters the die cavity and as the punch finishes its stroke, all surplus metal is forced to flow or extrude upwardly toward the vacant space remaining between the die and the punch end 27, this surplus metal thus forming the socket 12. The volume of metal in the slug to be formed is such that, when the punch has traveled a predetermined distance toward the bottom of the die, the displaced metal will be just enough to fill the space between the walls of the die and the punch. There will be no heavy flash to bet rimmed off and wasted, as is usually the case in ordinary methods of forging. Where the punch is provided with the point 28, when the punch reaches the lower end of the die cavity, while the socket is being formed, the conical point together with the punch pressure will effect further outward lateral displacement of metal at the bottom of the die into the recesses or corners 29 to provide sufficient metal for the teeth 11.

Upon completion of the forging stroke, the ram 26 reverses and pulls the punch clear of the forging and the die structure, the forging remaining in the die structure from which it may be readily removed after withdrawal of the wedge plates 17 and separation of the die holders 14 by the springs 22.

An initially forged or rough drill bit blank is thus produced to provide a blank that can be made into a finished bit in accordance with this invention. It should be understood, however, that this invention is not limited for use with a blank made according to the above described and illustrated forming steps.

It is necessary in the making of a drill bit to make the outside diameters of the cutting edges of a definite uniform shape and size. In accordance with this invention uniform shape and size is maintained by provision of sufficient metal in the initial blank or initially forged bit to create more than the desired tooth formation so that final shaping dies will actually shear off excess stock. At the same time, however, this invention reduces stock wastage to a minimum.

In most types of rock drill bits it is necessary to make provision for a stream of water to flow through the drill rod and the bit onto the face of the rock being cut, and usually a water hole is provided through the base of a bit which hole has usually heretofore been drilled after forging of the bit. Such drilling wastes stock.

According to this invention, the water hole is punched out and the punch expands the blank to provide metal for the final tooth shaping operation. Thus the punch insures the presence of sufficient metal for the teeth by flowing the metal laterally to increase the dimensions of the tooth forming portion of the bit. In fact, excess metal is forced to the tooth forming portion of the bit and this excess metal is sheared off by the final tooth shape die.

In the composite die and punch structure shown on Figures 5 and 6, 30 indicates a die holder which is fastened to the ram 31 of a punch press. A die housing 32 is secured in the recess 33 of the die holder 30 and extends downwardly and may be of cylindrical shape. In its lower wall the housing has the opening 34 sufficiently large to permit the initially forged bit or blank to enter freely. At the bottom of the housing and surrounding the opening 34 are die blades or blocks 35 having cutting edges 36 for trimming off surplus stock from the bit, and having forming surfaces 37 for shaping the outer sides of the bit teeth. These forming surfaces may have any protuberances, tapers, or other formation which it is desired to impress on the periphery of the teeth. Within the housing 32 is a bushing 38 extending between the housing top wall 39 and the dies for holding these dies against the bottom of the housing, and the dies may be held against rotational displacement by being set into grooves or channels 40 in the housing bottom wall which surrounds the passageway 34.

Depending from the housing top wall 39 is a guide stem 41 having the bore 42 through which extends the punch 43 which may be of any shape, such as round, oval, square, or otherwise. The head 44 of the punch fits into a recess 45 in the die holder 30 above the housing top wall 39 so that the punch is positively shifted down and up with the die holder. The punch projects downwardly below the stem 41 into the space between the die members 35. The stem 41 adds rigidity to the punch thereby enabling a comparatively small amount of material to be used for the punch which permits cheap replacement when the punch becomes worn or broken.

Slidable on the stem 41 is a tubular stripper member 46 having the annular head 47 above the annular shoulder 48 on the bushing 38. The stripper member is actuated by rods 49 extending through the upper wall of the housing 32 and the die holder 30 and terminating in the heads 50 movable in pockets 51 in the ram 31 against the pressure of the springs 52, the springs normally holding the rods in their lower position for holding the head of the stripper against the shoulder 48, as shown on Figure 5.

Mounted on the bolster plate 53 of the press is a trimming dolly 54 directly opposite the passageway 34 in the die housing 32. The dolly has V-shaped grooves in its upper face to receive the teeth 11 of the drill bit blank in such a manner that the minimum amount of distortion on the teeth occurs during the downward pressure stroke of the punch 43. The dolly has a diameter the size of the required periphery of the finished teeth, the peripheral upper edge of the dolly forming a cutting or shearing edge cooperating with the shearing edges 36 of the members 37 when the die structure is shifted downwardly by the ram 31. Extending through the dolly is the tapering passageway 55 whose upper cutting edge has substantially the diameter of the punch 43.

After initially being forged, the bit or blank is placed on top of the dolly 54 with the teeth of the blank seated in the grooves of the dolly as shown on Figure 5. The forged bit is preferably still sufficiently hot from the initial forging to be at an optimum temperature for efficient punching and trimming. As the ram 31 moves downwardly the punch 43 enters the socket of the bit and is forced against and into the bit body to form the water hole 56 and at the same time displacing some of the metal laterally to increase the width of the body as indicated by the dotted lines on Figure 5. As the ram continues its downward stroke a small amount of the metal in the shape of a slug 57 is cut and forced out of the bit body into the tapered passageway 55 of the dolly. Before the hole is completed, the die members 35 bring their cutting edges 36 into engagement with the surplus metal 58 resulting from the passage of the punch into the bit body. As the ram now completes its stroke, this surplus stock is sheared off and the water hole 56 is completed, and the die forming surfaces 37 of the dies 35 engage with the sides of the bit body for the final shaping of the body and tooth portions of the bit, as shown in Figure 6, the sheared off portions 58 and the slug 56 then dropping out of the press.

Where the initially forged bit has a conical cavity formed by the punch point 28 (Figures 3 and 4), such cavity, as shown in Figure 5, will assist in guiding the engagement with and passage of the punch through the bit body. It will be noted that the slug 57 punched out of the bit to form the water hole is of considerably less volume than the water hole, this being accounted for by the fact that part of the metal was displaced laterally by the punch to increase the stock in the bit for final tooth formation. A considerable quantity of metal, instead of being wasted, thus serves a very useful purpose by increasing the stock in the bit for tooth formation by the dies 35. The punching, trimming, and final shaping of the bit is quickly accomplished by the composite punch and die structure without reheating of the bit after forging thereof in the die structure shown on Figures 2, 3 and 4.

During the down stroke of the ram 31, the stripper member 46 is held by the spring pressed rods 49 against the top of the bit to be punched and trimmed, and then when the ram is withdrawn, the stripper will hold the bit down while the punch is being withdrawn therefrom.

If desired the trimming step may be omitted and the drill bit blank may merely be seated in a dolly such as 54 for the water hole punching operation. This invention therefore includes boardly the feature of forming the water hole in a drill bit by a punching operation while supporting the teeth of the bit in a manner to minimize distortion of the teeth under punching pressure. When the simultaneous trimming step is eliminated, the dolly can be of larger diameter than the bit and does not have to be provided with sharp peripheral edges for shearing the teeth to any particular size.

It may be desirable to provide indentations, corrugations, grooves, or the like, in the side walls of the socket of the bit to afford gripping means cooperating with the drill rod. Figures 7 and 8 show efficient means whereby this may be readily accomplished. A cutter holder 59 is secured to a ram 60 and has a recess 61 for a set of cutters 62 fulcrumed at their upper ends on pins 63 extending through the recess, the cutters at their lower ends being provided with cutting or indenting formations 64. Spring pressed detents 65 tend to hold the cutters with their lower ends together so that these ends may readily enter the socket 12 of the bit to be worked on. The bit is mounted on a platform 66 slidable on rods 67 extending upwardly from a base 68 which is securely fastened to the bolster plate 69 of the press. Springs 70 on the rods tend to hold the platform 66 in its upper position, as shown on Figure 7. Fixed in the base 68 is a pin 71 having a tapered end, this pin being axially aligned with the opening 72 in the platform 66 and the water hole 56 through the bit on the platform.

When the ram 60 descends, the ends of the cutters 62 enter the bit socket 12 and abut the bit body to force the bit and the supporting platform downwardly against the resistance of the springs 70. Near the end of this downward movement the taper or pointed end of the pin 71 is received between the lower ends of the cutters and the cutters are forced apart to apply their cutting or indenting formation 64 to the inner side of the socket wall to form the indentations or other formations on such walls, as shown by Figure 8. On the up stroke of the ram, the cutters are withdrawn from the end of the pin and the spring pressed detents 65 then swing the cutters back to their normal closed position. Instead of only two cutters as shown, more may be provided for simultaneously engaging with the bit for the desired impression in the socket wall.

I have thus produced an improved process and means for the manufacture of removable or detachable rock drill bits of the hollow socket type with increase in output per man hour, and the elimination of the usual machine or drill press work heretofore necessary with expensive machinery and a material waste of metal. Such machine work, because of machine tools cutting across the grain of the material, materially weakens the finished part, but with my improved process and means involving punching and dieing of an initially forged bit, the metal flow lines are unbroken and the bits are of increased uniform strength. If the original slug 24 from which the initially forged bit is made has the grain bands extending longitudinally thereof, these bands will merely be bowed or bent during the initial forging, the punching and the final shaping operations. Excess metal is sheared off parallel to the grain bands so that the finished bit does not have grain band ends exposed along any of its side walls. The finished structure with the grain bands extending unbroken from top to bottom is not only much stronger than a machined bit or a forged bit with a drilled water hole, but will also wear better since grain band ends are not exposed to abrasions during drilling.

With my process, all the operations are carried out while the bit is hot, as it is possible to do all of the forging, punching and die operations from the initial heat of the slug, the method being sufficiently fast to allow all of these operations to be performed without reheating. Therefore, it is obvious that my improved method enables drill bits or similar articles to be produced very rapidly and economically while at the same time effecting a saving of raw material which would otherwise be wasted as machined scrap.

I have disclosed and described a practical embodiment of my invention, but I do not desire to be limited to the exact construction, arrangement or operation shown and described, as changes may be made without departing from the scope of the invention.

I claim as follows:

1. Means for simultaneously forming a water hole in a drill bit of the type described and for trimming and forming the bit to final shape, comprising a support for the bit, a punch and a holder therefor, die structure on said holder surrounding said punch and having a cutting edge, and means for moving said holder for engagement of said punch with the bit to form the water hole therethrough and for engagement of the die structure with the outer side of the bit to shear off surplus metal and to form the outer side of the bit to final shape.

2. The method of forming a drill bit which comprises heating a solid metal slug to forging temperatures, inserting the heated slug into a recess of a die cavity having a blind end with drill bit teeth-forming recesses, pressing in one direction against the central portion of one end of the slug to force slug metal into the teeth-forming recesses and simultaneously flow slug metal in an opposite direction around the pressed central slug portion to form a socket, removing the resulting blank from the die cavity while the blank is still in a heated condition, supporting the teeth of the heated blank in confining complementary recesses, punching the heated blank without further heating to form a central hole through the blank while radially expanding the blank to provide a larger hole, simultaneously die-shaping the periphery of the expanded blank, and shearing off excess metal around the supported teeth of the blank to produce a trimmed drill bit of desired controlled shape and size with minimum loss of metal.

3. The method of forming a water hole in a forged toothed drill bit while simultaneously shaping the bit to finished size which comprises supporting the teeth of the blank in complementary recesses which hold the teeth against distortion, punching the blank to force a slug of metal out of the blank and leave a water hole in the blank, simultaneously with said punching operation expanding the blank metal radially to increase the outside dimensions of the tooth portion of the blank and simultaneously die-shaping the periphery of the expanded blank while shearing off surplus metal therefrom to form a finished drill bit.

4. The process of forming a socketed metal drill bit involving only one heating of the metal for the bit which comprises heating a metal slug to forging temperatures, die forging the heated slug into drill bit shape having a socket at one end and teeth at the other end, supporting the toothed end of the forged bit in complementary recesses holding the teeth against distortion, punch-cutting out a portion of the supported bit to form a water hole in the bit, simultaneously expanding the bit radially during the punch-cutting operation to increase the size of the water hole and the outside dimensions of the bit, die-shaping the expanded bit, shearing off excess metal from the outer surfaces of the expanded bit, and imprinting indentations in the inner wall of the socketed portion of the bit.

5. Apparatus for forming a water hole in a toothed drill bit and for forming the bit into final shape and size which comprises a support having recesses in the top thereof for receiving the toothed end of a bit to confine the teeth against distortion, said support having a central aperture communicating with the recessed end thereof, a shearing punch and a holder therefor, die structure in said holder disposed around said punch, and means for shifting said holder to force said punch through a bit mounted on said support to shear a slug from the bit against the mouth of the aperture in the support into the aperture of the support and to expand the bit into engagement with the die structure in said holder for shaping the bit into finished form while forming an enlarged water hole without substantial loss of bit metal.

6. Apparatus for making a finished drill bit from an initially forged bit blank which comprises an apertured mounting for said blank, a finishing die adapted to envelop said blank on said mounting, said die having a cutting edge at the base thereof, a shearing punch in the central portion of said die, means for moving said punch and die to force the punch through the blank while spreading the blank into full conformity with the die to simultaneously form a water hole through the blank and shape the blank, and said cutting edge of the die coacting with said mounting for shearing off excess metal from the blank.

PERCILL LIDDICOAT.